United States Patent [19]

Holmlund

[11] 3,837,231
[45] Sept. 24, 1974

[54] VIBRATOR FOR GENERATING DIRECTIONAL VIBRATIONS

[75] Inventor: Henrik Holmlund, Jarfalla, Sweden

[73] Assignee: Aktiebolaget Vibro-Verken

[22] Filed: Jan. 22, 1973

[21] Appl. No.: 325,640

[30] Foreign Application Priority Data
Jan. 27, 1972  Sweden .................................. 916/72

[52] U.S. Cl. ................ 74/61, 192/105 B, 74/217 R
[51] Int. Cl. ........................................... F16h 33/00
[58] Field of Search ......... 74/61, 217 R; 198/220 D; 192/105 B, 105 C

[56] References Cited
UNITED STATES PATENTS

| | | | |
|---|---|---|---|
| 2,809,535 | 10/1957 | Hein et al. | 74/217 R |
| 2,995,944 | 8/1961 | Ciaccio | 74/217 R |
| 3,332,293 | 7/1967 | Austin et al. | 74/61 |
| 3,625,074 | 12/1971 | Waschulewski et al. | 74/61 |

Primary Examiner—Benjamin W. Wyche
Assistant Examiner—Wesley S. Ratliff, Jr.
Attorney, Agent, or Firm—Brumbaugh, Graves, Donohue & Raymond

[57] ABSTRACT

A vibrator of the type having a pair of bodies rotatable eccentrically about respective mutually parallel axes in opposite directions and gears associated with the eccentrically rotatable bodies meshing to provide co-ordinated counter-rotation of the bodies is provided with an improved drive arrangement for selectively driving the bodies in rotation in either of two distinct and separate phase relationships. One of the rotatable bodies is rotatable relative to the gear associated with it, and matching abutments on that body and gear are mutually engageable to transmit driving force between them in two different angularly spaced-apart positions of the rotatable body, relative to the associated gear. A belt drive having a shifting mechanism is arranged to transmit rotational power either to the body or the gear of the relatively rotatable body and gear components.

6 Claims, 7 Drawing Figures

VIBRATOR FOR GENERATING DIRECTIONAL VIBRATIONS

BACKGROUND OF THE INVENTION

This invention relates to a vibrator of a type that generates directional vibration and is primarily intended for use in generating reciprocatory motion in a plate or similar element.

In a basic form, a vibrator of the type to which the invention relates comprises a pair of bodies that are rotatable eccentrically about respective mutually parallel axes in opposite directions, the rotation of the respective bodies being coordinated by meshing gears, one of which is associated with each of the bodies. In some instances, it may be desired to alter the direction of vibration of the vibrator.

It has been proposed heretofore that a change in direction of the vibration of the vibrator can be produced by changing the phase relationship between the two rotating bodies. One form of device for effecting such a change in the phase relation of bodies is a shifting element that can be engaged in a number of coupling positions with one of the bodies, the element being operated by a claw-type of operator. This and similar arrangements, however, require the use of braking elements on the rotating body with which the shiftable element is engaged in order to bring about a change in the phase position prior to engagement of the shifting device to lock the body into the new phase position. Another way, also known heretofore, for changing the direction of the vibrating forces generated by a vibrator of the type to which this invention relates is to reverse the direction of rotation of the drive element. This, however, requires a special gear box or other mechanical shifting system which complicates and increases the cost of the vibrator.

SUMMARY OF THE INVENTION

There is provided, in accordance with the invention, the improvement in a vibrator of the type that generates directional vibrations of an arrangement for changing the direction of vibration in a sure and effective manner and using a system which is of relatively low cost and of essentially trouble-free operation. More particularly, one of the two bodies of the vibrator and the gear associated with that body are rigidly connected for conjoint rotation, while the other rotating body and its associated gear are mounted for relative rotation, the extent of which, however, is limited by a lost motion coupling between the gear and body. To facilitate identification of the elements of the vibrator, in accordance with the present invention, the body and gear that are relatively rotatable (to a limited extent) and are coupled by a lost motion coupling will be referred to hereinafter as the "input body" and the "input gear," since power is transmitted into the eccentrically rotatable bodies by way of such relatively rotatable gear and body.

More particularly, the lost motion coupling between the input gear and input body may be in the form of abutments on the input gear and input body that are mutually engageable to transmit driving force between the input body and input gear in two different, angularly spaced-apart positions of the input body relative to the input gear. When power is applied, for example, to the input body, the abutment element on the body engages the abutment element on the input gear so that the power is transmitted from the body to the gear. Conversely, if power is applied to the input gear, the abutment element on the gear engages the abutment element on the input body so that the power is transmitted from the input gear to the input body. In either instance power is transmitted from one gear to the other and thus to the other rotating body.

The power drive system for the vibrator includes a transmission that is shiftable selectively either to drive the input body or to drive the input gear, or, in some cases, to drive both the input gear and input body. The transmission system is a belt transmission, and one of a variety of shifting devices may be employed in conjunction with the belt transmission to effect transfer of the power path between the input body and the input gear. Examples of the shifting devices in the belt transmission of the vibrator are described in detail below and are illustrated in the drawings. Accordingly, a better understanding of the invention may be attained from the following description of exemplary embodiments, taken in conjunction with the figures of the accompanying drawings.

DESCRIPTION OF EMBODIMENTS

Figure 1:
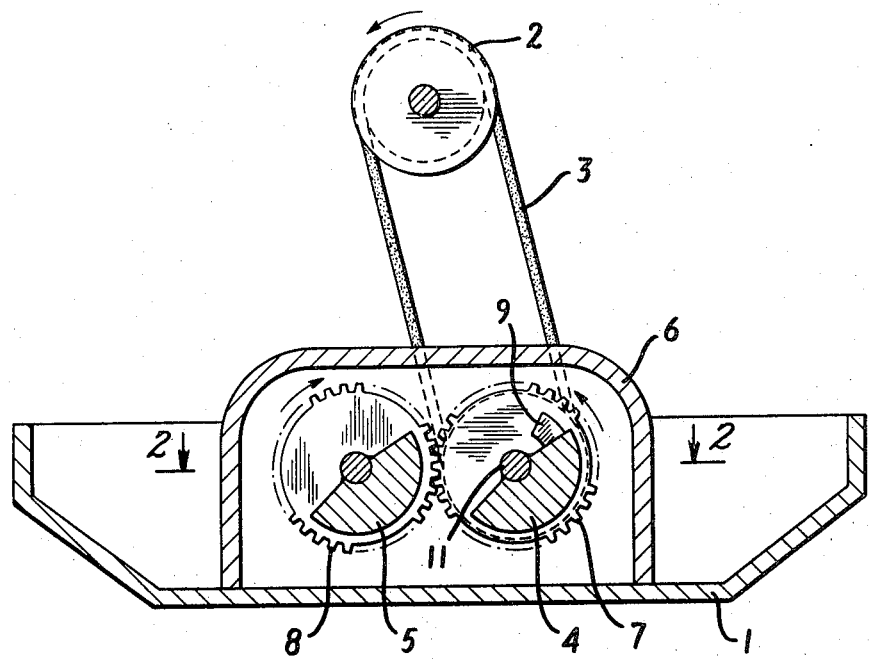
FIG. 1 is a side view in cross section of a directionally vibrated plate powered by the vibrator according to the invention, the view being generally schematic.

Referring to FIG. 1 of the drawings, a vibrator of the type to which the invention relates is often employed in imparting directional vibration to a plate 1 in a direction, such as the direction represented by the arrows in FIG. 1, that is a function of the phase relationship between two rotating bodies which constitute the basic components of the vibrator. More particularly, the vibrator includes an appropriate motor or other power source that drives a pulley 2 which, by way of one or more power transmitting belts 3, transmits driving power to a pair of bodies 4 and 5. The bodies 4 and 5 are rotatably mounted in a housing 6. The centers of gravity of the respective bodies 4 and 5 are eccentric to their respective axes of rotation, and the axes of rotation of the two bodies are substantially parallel to each other. The bodies counterrotate relative to each other in coordination, as established by meshing gears 7 and 8. One of the gears 8 is affixed to the corresponding rotating body 5 for conjoint rotation of the body 5 or gear 8 at all times. The other gear 7 is mounted for rotation independently of the corresponding rotating body 4; however, the degree of such independent rotation is limited by a lost motion coupling between the gear 7 and the body 4, such lost motion coupling being provided by an abutment or a projection 9 on the gear 7 that is engageable in two different positions with portions of the body 9 (as is described in greater detail below in connection with FIGS. 3 and 4 of the drawings).

The gear 7 and body 4, which have been previously (and will hereinafter be) identified as the "input gear" and "input body," are arranged for independent or conjoint driving power input. More particularly, the gear 7 has a tubular shaft 10 that extends out through an opening 12 in the housing and is journaled for a rotation about an axis concentric to the axis of rotation of the body 4. An extension 11 on the shaft of the input body 4 is received coaxially within the tubular shaft 10 associated with the input gear 7. Friction discs 13 and 14 are formed on or mounted on the respective ends of the tubular shaft 10 and the shaft extension 11, the friction discs being arranged in spaced facing relation and receiving between them a pulley 15 that is rotatably mounted on the shaft extension 11 and is also arranged to be shifted axially such that friction surfaces formed thereon are engageable with the respective friction discs 13 and 14.

The pulley 15 is operated by a lever 16 that is pivoted about a stud 17 mounted on an appropriate fixed frame or other element of the apparatus. One end of the lever 16 is received in a groove 18 in the pulley and responds to pivotal movement of the free end of the lever 16 (as represented by the arrowed line at the end of the lever 16) by shifting the pulley 15 into frictional, driving contact with either the disc 13 or the disc 14. When there is frictional engagement between the pulley 15 and the disc 13, the gear is driven in rotation, and the body 4 is driven in rotation by the gear, via the lost motion coupling abutment 9. Conversely, when the pulley is shifted frictionally to engage the friction disc 14, the rotating body 4 is driven in rotation and in turn imparts a driving rotation to the gear. In either instance, the gear 7 drives the gear 8 which, in turn, rotates the body 5.

Figure 3:
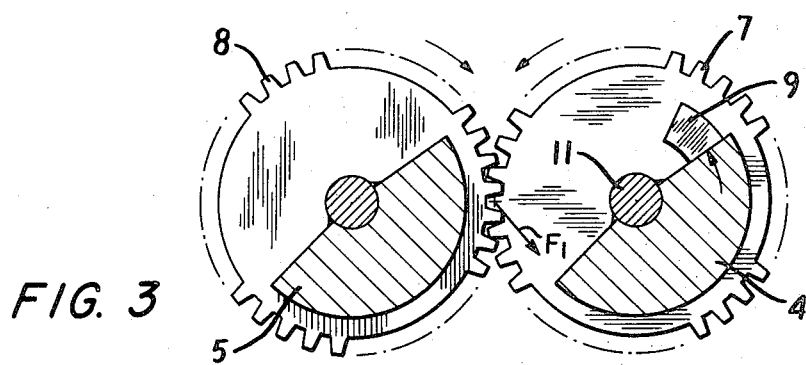
FIGS. 3 and 4 are cross-sectional views of the rotating elements of the vibrator of FIGS. 1 and 2 and illustrate the rotating bodies in different phase relationships providing different directions of vibration.

FIG. 3 of the drawings illustrates the mode or phase of operation of the vibrator in which the input body 4 is driven by engagement of the pulley 15 with the fricton disc 14 associated with the input body 4. The rotation imparted to the input body 4 is counterclockwise, as represented by the arrows. Such counterclockwise rotation of the body 4 brings a surface of the body into engagement with the abutment 9 on the input gear 7, thereby imposing a driving force from the body 4 into the gear 7. The intermeshing of the gears transfers the rotational power from the gear 7 to the gear 8, and thus the other rotating body 5 is counterrotated in coordination with the rotation of the input body 4. The phase of rotation of the two bodies 4 and 5 generates a predominant vibratory force along the direction of the arrow $F_1$ of FIG. 3.

Figure 2:
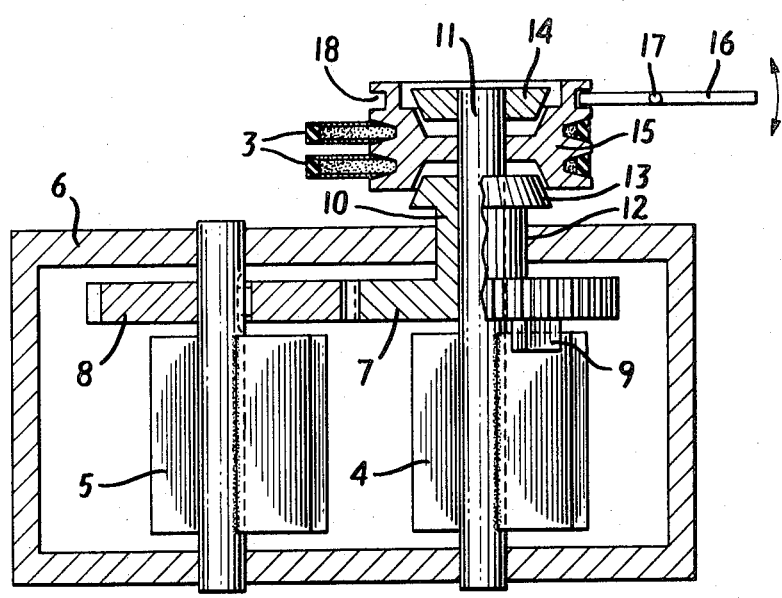
FIG. 2 is a top view in cross section of vibrator of FIG. 1, the view being taken generally along a plane designated by the line 2—2 of FIG. 1 and being on a larger scale than FIG. 1.
Figure 4:
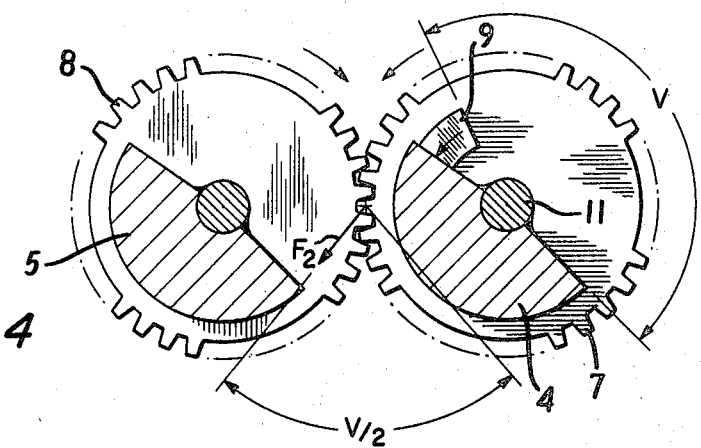

FIG. 4 of the drawings illustrates the other phase of operation of the vibrator of FIGS. 1 and 2. More particularly, engagement of the pulley 15 with the friction disc 13 imparts rotation to the input gear 7 in a counterclockwise direction, thereby bringing the abutment 9 into engagement with a surface on the input body 4 and imparting rotating force to the input body 4. As in the mode of operation depicted in FIG. 3 of the drawings, the gear 7 also imparts rotational force to the gear 8, which, in turn, rotates the body 5.

It is apparent that inasmuch as the abutment 9 overlaps the end portion of the input body 4, the amount of relative rotation between the input body 4 and the input gear 7 is restricted to an angle V (see FIG. 3). The two angularly spaced-apart positions between the two phases of operation illustrated in FIGS. 3 and 4 establishes a similar change in the direction of vibration, the direction of vibration in the phase illustrated in FIG. 4 being predominantly along a line designated $F_2$. In other words a change in the path of input power from the input body 4 to the input gear (i.e., from the mode of FIG. 3 to the mode of FIG. 4) results in a phase displacement, specifically a lagging displacement, through angle V of the input gear 7 relative to the position of the rotating input body 5. As a result, the predominant direction of vibration is altered by an angle that is equal to the angle of phase change V divided by 2, such angle being shown diagrammatically in FIG. 4 and labelled "V/2".

Figure 5:
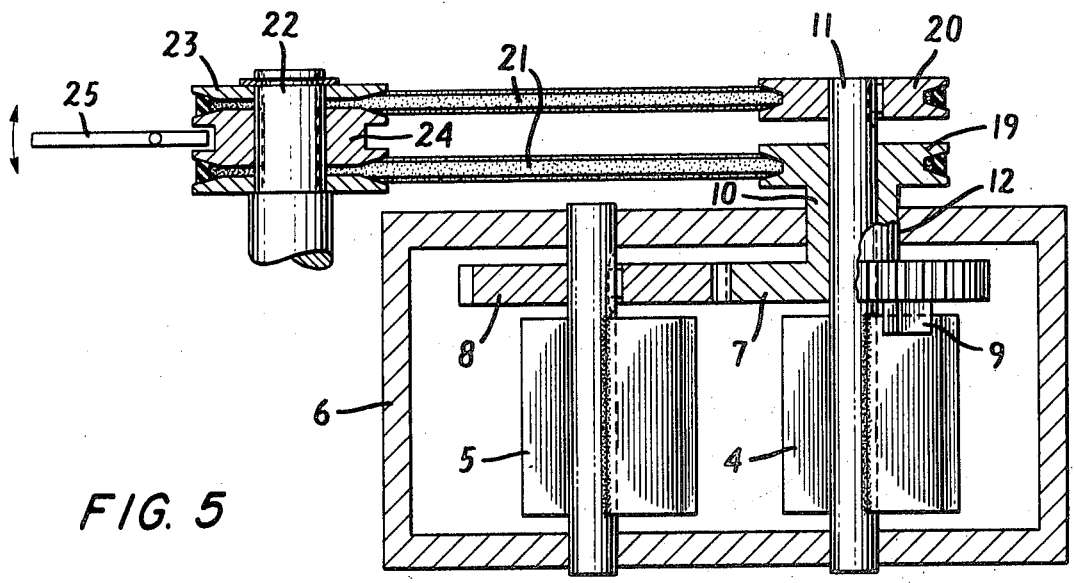
FIG. 5 is a top view in cross section of a vibrator embodying a modified form of power switching device for changing the direction of vibration of the vibrator.

FIG. 5 shows a modified form of the transmission system and, in particular, a shifting device by which the relative phase positions of the two eccentrically rotating bodies are altered. The basic arrangement of the vibrator is the same as that of the vibrator illustrated in FIGS. 1 and 2, and therefore the same reference numerals are applied to corresponding elements in FIG. 5. In the modification illustrated in FIG. 5, the input gear 7 and input body 4 are equipped with pulleys 19 and 20, respectively, instead of friction discs. Each pulley 19 and 20 is driven by a V-belt 21 that is, in turn, driven by an adjustable pulley 23 that is mounted rigidly on, or appropriately driven from, pulley 23 drive shaft 22 of a motor. The pulley 23 includes a movable central element 24 that defines one part of each of two V-grooves, each of which receives one of the respective belts 21. The central element 24 of the adjustable pulley 23 is shiftable axially of the shaft 22 by a lever 25 and upon being shifted changes the effective diameters of the respective pulley grooves. A change in the effective diameters of the pulley grooves increases and decreases the speeds of the respective belts 21, thereby altering the relative speeds of rotation of the pulleys. Thus, the embodiment of FIG. 5 permits either the input gear or the input body to be speeded up so that it catches up with the other. For example, if the pulley 20 is caused to rotate more rapidly than the pulley 19, the rotating body 4 will catch up with the gear 7 and will, in the process, effect a change from the phase illustrated in FIG. 4 to the phase illustrated in FIG. 3.

Figure 6:
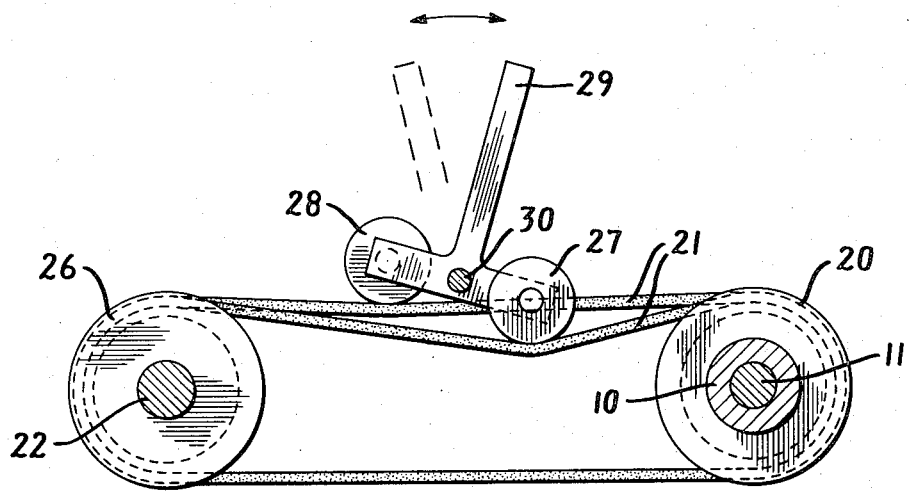
FIG. 6 is a side view in elevation of another form of switching device associated with the power transmission of the vibrator.
Figure 7:
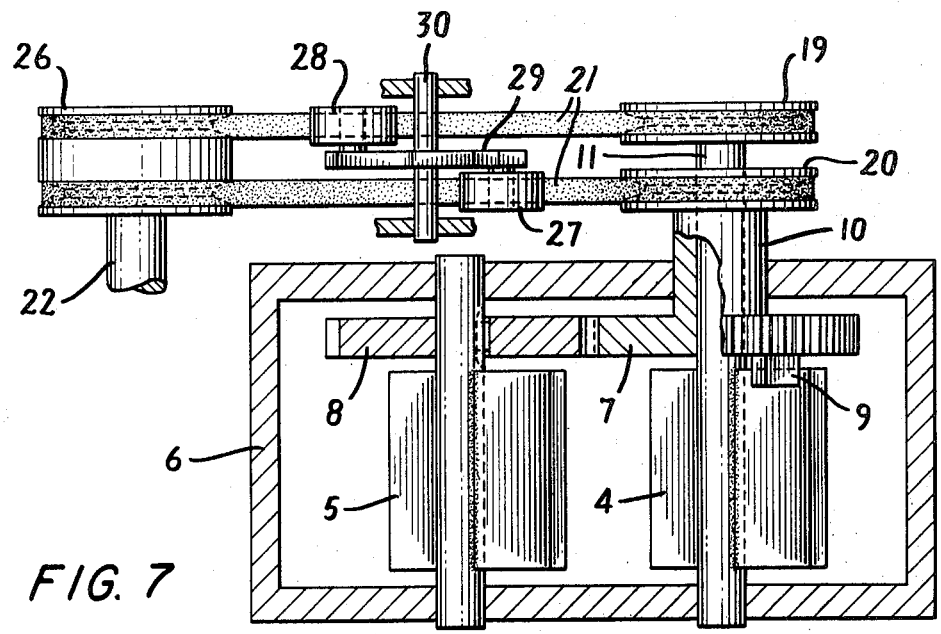
FIG. 7 is a top view of a vibrator equipped with the switching device illustrated in FIG. 6, the vibrator being shown in cross section.

Another exemplary form of device for changing the phase of operation of the vibrator is illustrated in FIGS. 6 and 7. Again, the basic parts of the vibrator are the same as those illustrated in FIGS. 1 and 2 and described above, are assigned the same reference numerals as before, and need not be further described here. Like the embodiment of FIG. 5 the embodiments of FIGS. 6 and 7 include a pulley 19 associated with the input body 4, a pulley 20 associated with the input gear 7, and a belt 21 associated with each pulley 19 and 20. Instead of an adjustable drive pulley, however, a dual pulley 26 is driven by a power output shaft 22. In normal operation in a given phase of operation, both pulleys are under a sufficient tension to share the driving power and impart rotation to both the input gear 7 and the input body 4.

If, however, it is desired to shift the phase of operation, one of the belts 21 is placed under a greater tension and therefore is capable of imparting a greater driving force to one of the bodies than to the other. The shifting of the amount of tension on the respective pulleys 21 is accomplished by way of a shifting device in the form of a generally T-shaped lever 29 that is pivoted on a pivot axis 30 and has a pair of rollers 27 and 28 positioned to engage the respective drive belts 21.

In operation, if, for example, a greater tension is applied to the belt 21 that drives the pulley 20, the power transmitted from the pulley 26 to the pulley 20 will be greater than the power transmitted from the pulley 26 to the pulley 19. Similarly, the input body 4 is subjected to greater driving power than the input gear 7. Accordingly, the pulley 19 will slip in the belt during the changeover and allow the input body 4 to catch up to the input gear 7.

Thus, there is provided, in accordance with the invention, an improved arrangement for varying the direction of vibration of a vibrator. The apparatus of the invention is of simple and inexpensive construction and is highly effective and easily operated. A change in the direction of rotation is accomplished without any necessity to reverse the direction of rotation of either of the rotating bodies or the drive elements, which appreciably reduces the complexity and the costs of the equipment and reduces the chances of breakdowns. The invention also makes it possible to drive one or the other of the input gear or input body with a greater power than the other, thus to ensure a phase shift and alteration of the direction of vibration, even though self-synchronization of the rotating bodies occurs in each position. In other words, the system is constructed to permit the apparatus to power itself from one phase to another through enabling variable power transmission to the respective components.

It is important to point out that the specific form of lost motion connected between the input gear and the input body may take various specific forms. For example, the lost-motion coupling may be constructed into pulleys or other elements associated with the gear and body, rather than on the gear and body themselves. Various shoulder and stop arrangements on the pulleys or gear and body or in the conjoint portions of the shafts is appropriate and should be considered to be included within the scope of the invention.

The above-described embodiments of the invention are merely exemplary, and the above-mentioned and other variations and modifications of the invention will be evident to those skilled in the art without departing from the spirit and scope of the invention. All such variations and modifications are intended to be included within the scope of the invention as defined in the appended claims.

I claim:

1. In a vibrator of a type having first and second bodies rotatable eccentrically about respective mutually parallel axes in opposite directions, first and second gears associated with the first and second bodies, respectively, the gears meshing for coordinated counter-rotation of the bodies, and means for driving the bodies in rotation, the improvement of a drive arrangement for selectively driving the bodies in either of two distinct and separate phase positions comprising means mounting the first body for rotation relative to the first gear, an abutment on the first body, an abutment on the first gear, the said abutments being located on the first body and first gear, respectively, for mutual driving engagement to transmit driving force between the first body and first gear in two different angularly spaced-apart positions of the first body relative to the first gear, and means for transmitting rotational power from said drive means selectively either to the first body or to the first gear including a belt transmission and a shifting device in the belt transmission.

2. The improvement according to claim 1 wherein the shifting device includes cooperating friction elements interposed in the paths of power to the respective first body and first gear, one of the elements being shiftable between alternative positions to effect said selective power transmission.

3. The improvement according to claim 1 wherein the shifting device includes a friction element on each of the first body and first gear and a pulley driven by a belt, the pulley having friction surfaces thereon and being shiftable to move the respective friction surfaces thereof into selective engagement with the friction elements on the respective first body and first gear.

4. The improvement according to claim 1 wherein the power transmission means includes a first drive pulley connected to the first body, a second drive pulley connected to the first gear, a first and a second belt received by the respective first and second pulleys, and wherein the shifting device includes a member shiftable to conduct power selectively to the respective first and second belts.

5. The improvement according to claim 4 wherein the shifting device is a compound adjustable pulley, the shiftable member of which defines a portion of a pulley for each of the first and second belts and is shiftable frictionally to engage one belt and release the other from power transmitting frictional engagement.

6. The improvement according to claim 4 wherein the shifting device is a belt tensioning system, the movable member of which has first and second portions selectively coacting with the respective first and second belts to impose driving tension on one and release the other from driving tension.

* * * * *

UNITED STATES PATENT OFFICE
CERTIFICATE OF CORRECTION

Patent No. 3,837,231              Dated September 24, 1974

Inventor(s) Henrik Holmlund

It is certified that error appears in the above-identified patent and that said Letters Patent are hereby corrected as shown below:

Column 3, line 55, "transfers the" should be --transfers that--; Column 4, line 35, "from, pulley 23" should be --from, the--; Column 5, line 39, "connected" should be --connection--.

Signed and sealed this 1st day of April 1975.

(SEAL)
Attest:

RUTH C. MASON
Attesting Officer

C. MARSHALL DANN
Commissioner of Patents
and Trademarks